June 9, 1959 G. W. CLARVOE 2,889,922
ADHESIVE APPLICATOR
Filed Oct. 13, 1954 2 Sheets-Sheet 1
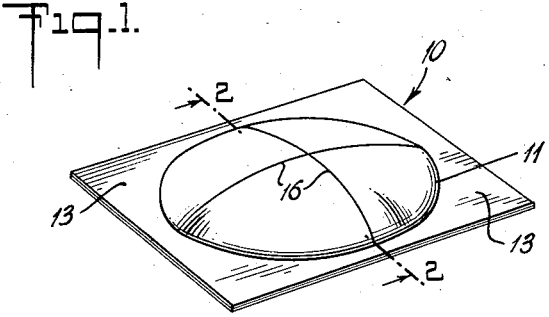
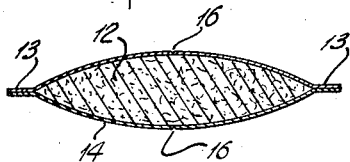
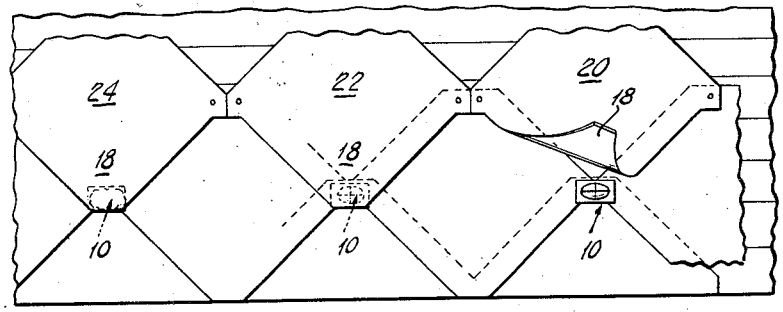
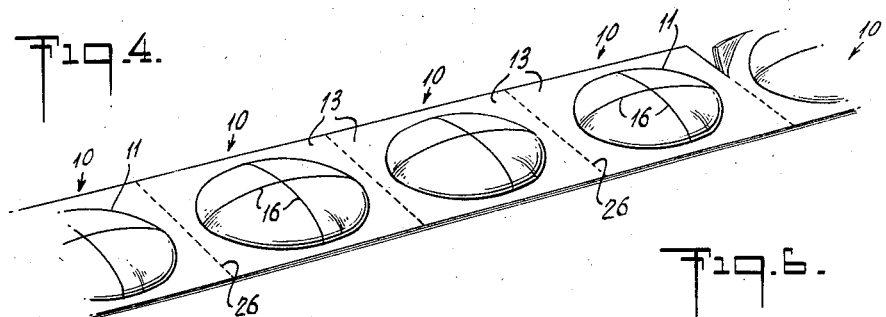
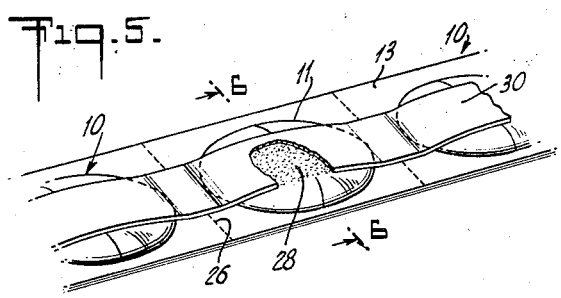
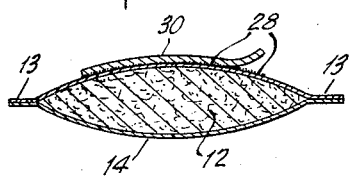
INVENTOR
GEORGE W. CLARVOE.
BY Virgil C. Kline
ATTORNEY

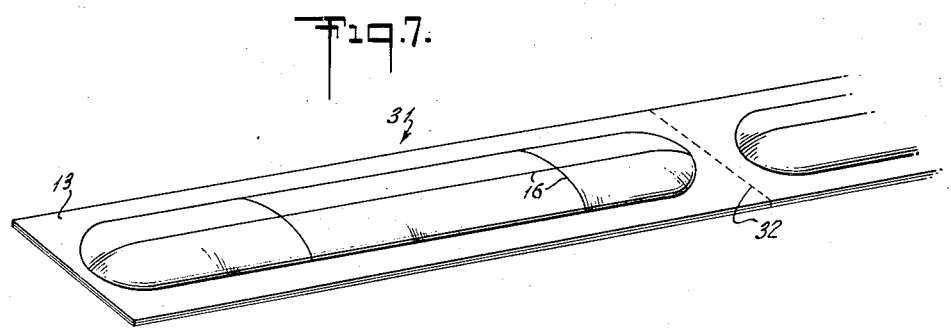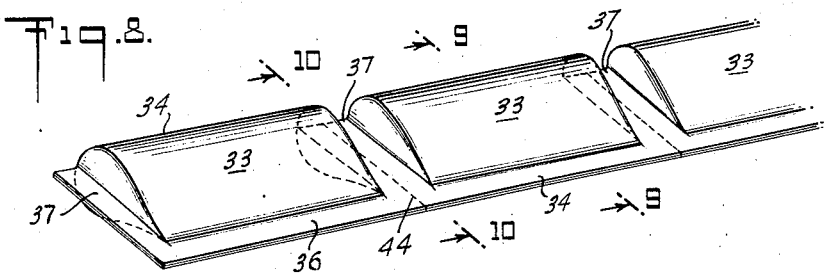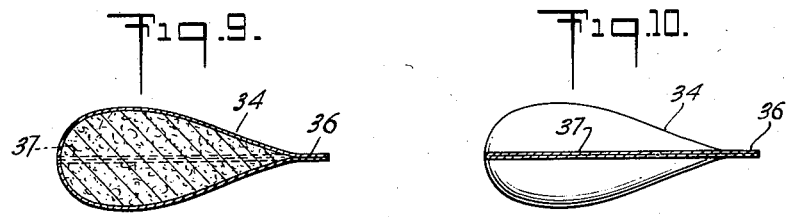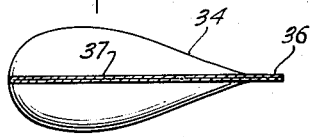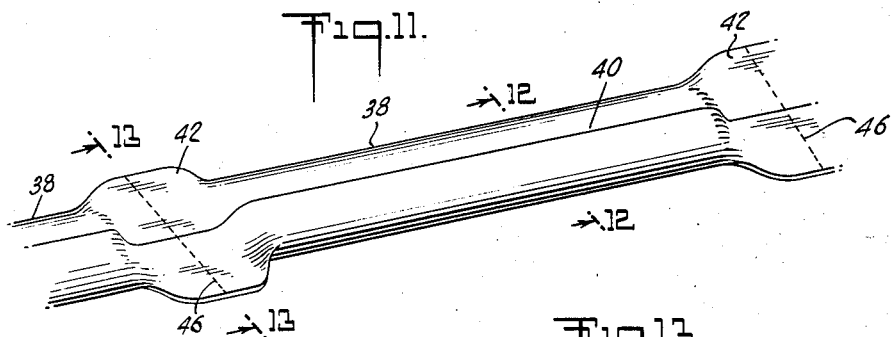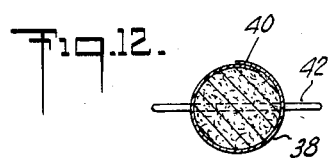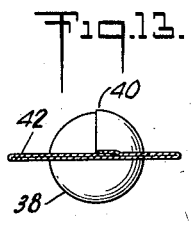

United States Patent Office 2,889,922
Patented June 9, 1959

2,889,922

ADHESIVE APPLICATOR

George W. Clarvoe, Somerville, N.J., assignor to Johns-Manville Corporation, New York, N.Y., a corporation of New York Application October 13, 1954, Serial No. 462,052

6 Claims. (Cl. 206—56)

My present invention relates to improved means for applying adhesives and other materials between overlapping surfaces and, more particularly, to such means having characteristics of special merit for cementing or sealing overlapping building elements.

Heretofore it has been known to secure construction materials of various types by adhesives. For example, adhesives have been employed between the lapping margins of roofing sheets, between flexible shingle tabs and shingles of the next lower course, and in other similar situations. Also, adhesives have commonly been used to secure various types of panels, such as sound-absorbing blocks or slabs, to the ceiling or wall surface. Conventionally, the adhesive materials are applied to brushing or by gun, trowel or knife application, depending upon the particular consistency and other characteristics of the material. Each of these operations presents serious drawbacks with respect to the difficulty of controlling the quantity of material used, the messiness of the operation, and the like.

The instant invention has for its principal object the provision of a convenient means for the application of such adhesives, and for the application of sealing materials, caulking compounds and the like, for the uses referred to above and for other analogous uses, which avoid the difficulties inherent in the prior operations.

Another object of the invention is the provision of means for readily applying adhesives or other sealing compounds which are too viscous, stringy or sticky for practical application by conventional methods.

Another object of the invention is the provision of an applicator for materials as referred to above, and for a method of operation which eliminates the necessity of tools or apparatus of any kind, and which avoids messiness and other difficulties generally accompanying the application of such materials in the field.

A further object of the invention is the provision of an applicator for adhesives, caulking compounds, and the like, the applicator comprising a readily frangible container or capsule enclosing a predetermined, required quantity of the adhesive or other material. In operation the capsule containing the material is placed between the overlapping elements to be secured and is ruptured by the application of pressure to the overlapping portions whereby the material is released and caused to flow between the overlapping portions. For example, a capsule containing an asphalt putty adhesive in given amount may be placed beneath the extending, exposed tab of an asphalt shingle and, by simple pressure, or by the blow of a hammer on the tab, the capsule broken to cause the adhesive to flow between the overlapping tab and underlying shingle and secure the two together. No tools are required and the disadvantages of the application of an adhesive by conventional means, such as a gun, trowel or the like, are entirely avoided. The method, furthermore, enables sticky gummy materials which have superior adhesive properties, but which are most difficult to handle in the field by prior methods, to be used with equal facility to the more conventional materials. Where a relatively long seam is to be closed, the container for the adhesive or caulking material may be of relatively great length or a series of integrally connected containers may be employed.

My invention will be more fully understood and further objects and advantages thereof will become apparent when reference is made to the more detailed description thereof which is to follow and to the accompanying drawings in which:

Fig. 1 is a perspective view of an applicator in accordance with the instant invention;

Fig. 2 is a sectional view taken on the line 2—2 of Fig. 1;

Fig. 3 is a diagrammatic view of a partial roof or wall section illustrating the operation of the applicator of Figs. 1 and 2;

Fig. 4 is a perspective view depicting an embodiment of the invention comprising a series of applicators of Fig. 1;

Fig. 5 is a perspective view illustrating an additional feature of the invention;

Fig. 6 is a sectional view taken on the line 6—6 of Fig. 5;

Fig. 7 is a perspective view of a modified form of the applicator;

Fig. 8 is a perspective view of another modified form of the applicator;

Fig. 9 is a sectional view taken on the line 9—9 of Fig. 8;

Fig. 10 is a sectional view taken on the line 10—10 of Fig. 8;

Fig. 11 is a perspective view of a further modified form of the applicator;

Fig. 12 is a sectional view taken on the line 12—12 of Fig. 11; and,

Fig. 13 is a sectional view taken on the line 13—13 of Fig. 11.

Referring now to the drawings and, more particularly, to Figs. 1, 2 and 3, there is shown a device 10 for applying any suitable adhesives, caulking compounds and the like of a character adapting them for cold application. The device 10 is in the form of a container or capsule comprising an envelope or casing 11 formed of a thin, substantially air-tight, but relatively rupturable or frangible material which is resistant to conventional solvents employed as ingredients of the adhesive or other materials to be applied. To meet these requirements the casing may be made from thin films of cellophane, cellulose acetate, plastic ethyl cellulose, plastic Vinylite, rubber and the like, all of which and other equivalent materials are hereinafter termed "rupturable" or "frangible" films.

The casing encloses a predetermined quantity of the sealing material 12 such as an adhesive or caulking compound of any suitable type. For purposes of example only such material, to be used, say, for sealing or adhering the tab of a flexible shingle, may be of putty-like characteristics and consist of approximately 35–50% asphalt having a melt point of 150–160° F., 15–30% of a solvent such as mineral spirits, or petroleum naphtha and 25–40% of fibrous and mineral filler. To secure acoustical blocks or the like, the material may comprise natural or artificial gums cutback with suitable solvents. It will be understood that the invention is not limited to any particular adhesive or other material for the capsule.

In the embodiment shown in Figs. 1 and 2, the casing is formed of overlapped layers of the rupturable films, the overlapped layers being secured together at their marginal portions 13 to define an interior, closed pocket 14 containing the predetermined quantity of the material 12. Where the frangible films comprise cellophane or any of the other thermoplastic materials referred to above, the sealing of the marginal portions is preferably effected by subjecting them to heat and pressure. However, they may be cemented, or other means may be employed for joining them. For example, the marginal portions may be wetted with a solvent to partially dissolve the film and render it adhesive, and the marginal portions then be pressed together to obtain a joining or welding effect.

To insure easy rupture of the casing and to control to an appreciable extent the direction and character of flow of the contained material, the casing may be provided with what may be broadly termed "zones of weakness," which may comprise weakened lines or the like. This weakened zone feature may be obtained, for example, by controlling the adhering of the marginal portions to provide a bond which is weaker than the material of the casing. Alternatively, weakened lines comprising, for example, grooves 16 as indicated in Figs. 1 and 2, may be formed in one or both of the overlapping films. The weakened zones may desirably be placed in one portion of the casing, so that the controlled flow of adhesive material may be away from the exposed edge of the overlying building element.

The method of operation with the capsules 10 described above is illustrated in Fig. 3 where they are shown as employed for securing the extending tabs 18 of a course of hexagonal shingles to the underlying course in substitution for the means now conventionally employed, such as metal clips, trowel applied adhesives and the like. A capsule 10 is placed on each shingle of an underlying course in position to be overlapped by the tabs of the shingles of the higher course (see shingle 20, Fig. 3). The shingle of the higher course is then positioned with its tab overlying the capsule and the tab is pressed down firmly (see shingle 22, Fig. 3), causing rupture of the capsule along weakened lines 16, if such are provided, or by separation of the overlapping elements of the capsule at their marginal portions, or in other ways to release the adhesive and cause it to flow between the overlapped portions of the shingles (see shingle 24, Fig. 3).

The containers or capules of Figs. 1 and 2 may be made by a continuous process. For example, the selected frangible, film, such as cellophane, may be fed in two separate strips. The strip to form the lower wall of the containers is pressed to form a series of cup-like depressions, into which the adhesive or other material is automatically injected in the proper and predetermined amount. The second strip, which may either be flat or reversely embossed to the first strip, is applied over the first strip and sealed as previously mentioned, either by the application of heat and pressure, by an adhesive or other means. The individual capsules can then be separated from the strip. Alternatively, as illustrated in Fig. 4, the capsules may be left in strip form and the lines of separation demarked by perforations 26 or the like, whereby the individual containers or capsules may be separated from the strip when required.

Referring now to Figs. 5 and 6, a further feature of the invention is illustrated. In this embodiment, the containers or capsules are of similar construction and configuration as before. The additional feature resides in the provision of a spot or zone of adhesive 28 on a face of the capsule to hold the same temporarily in position while the overlapping building elements or the like are being brought into adjacent relationship. The material used for this purpose may be any of the conventional pressure-sensitive adhesives. Suitable examples are a blend of an elastomer such as rubber, neoprene and the like, with a non-aging, non-oxidizing, tacky resin, an elastomer such as rubber, neoprene and the like, in combination with suitable bituminous compounds such as asphalt, and high polymer, tacky, non-aging, non-oxidizing resins such as the polybutylenes. Such materials may include additional or supplemental plasticizers, modifying resins and the like. Preferably, a masking or covering tape 30 is applied over adhesive 28 to prevent activation prior to use of the capsules, the tape 30 being stripped off when the capsules are employed. Capsules having the adhesive zones 28 are of particular utility in connection with the securing of panels, shingles or the like on vertical wall surfaces, ceilings, etc. where the maintenance of the capsules in position prior to their being ruptured would otherwise present difficulties.

For caulking elongated joints, for applying adhesive between the lapping edges of roll roofings, and in other similar situations where lengthy seals are required, capules 31 in the form shown in Fig. 7 may be employed. In this instance the capsules are of similar character to those previously described, except that they are made of much greater length than width to extend a substantial distance along the joint. Thus, they may be, say, a foot or more in length. Preferably, the elongated capsules are made in continuous strips and separated by lines of perforations 32 similar to lines 26 of the form of Fig. 4.

In lieu of employing two overlapping strips of the frangible film material for the casings, as illustrated particularly in Figs. 1 to 7, other constructions may be used. Figs. 8–10 depict a form of the invention in which the casings 33 are made from a single strip 34 folded on itself and with its overlapping edges joined at 36 by heat and pressure or other means, as previously described, to form an elongated, hollow tube. The tube is closed at intervals as indicated at 37 by flattening it and joining the opposite walls at the flattened portions by heat and pressure, or other means as before. In the form shown in Figs. 11–13, containers 38 are also made from a single strip of the film material, the strip in this instance being rolled or overlapped to form a longitudinally extending joint 40 sealed in like manner to that employed for the overlapping portions of the other forms. The tube is flattened at intervals as indicated at 42, and the opposed walls similarly joined together. In the constructions of Figs. 8–13 the individual capsules may be separated at the time of manufacture by dividing the tubes at the flattened portions, or lines of perforations shown at 44 and 46 respectively may be formed in these portions to permit their ready separation at a later date.

The applicator of the instant invention permits the use of adhesives, cements, caulking compounds, roof putties and other sealing materials which are difficult to handle by conventional means. Particularly, it provides a facile means for the application of sticky, gummy materials, which are the hardest to handle in the field by conventional means, but which have superior qualities. Also, the amounts required for particular uses may be accurately controlled. Furthermore, the messiness and other disadvantages in the handling of materials of these types are avoided. The applicator may be used at any place in building constructions and the like, where the use of adhesives is desired. Thus, for example, in addition to their use in securing shingle tabs as described above, the applicators are suitable for mounting acoustical blocks and other wall or ceiling panels, for caulking prefabricated building panels, as a sealing under the battens currently employed in construction practice and in many other locations. In referring to these various applications, the term "building elements" is employed to designate the elements to be joined by the adhesive.

Having thus described my invention in rather full detail, it will be understood that these details need not be strictly adhered to but that various changes and modifications may suggest themselves to one skilled in the art, all falling within the scope of the invention as defined by the subjoined claims.

What I claim is:

1. A device for securing an overlapping building surface covering sheet to an underlying building surface covering sheet comprising a readily rupturable casing enclosing an adhesive material, said casing carrying a layer of a pressure-sensitive adhesive on one side thereof whereby said casing may be adhered to one of said building surface covering sheets by said pressure-sensitive adhesive and, when said building surface covering sheets are pressed together, the casing may be ruptured to release the sealing material between said building surface covering sheets.

2. A device for securing an overlapping building surface covering sheet to an underlying building surface covering sheet comprising a casing of a size and character to be placed between the building surface covering sheets, and a spreadable, flowable adhesive material within said casing in predetermined, suitable amount for adhering said covering sheets securely together, said casing comprising a rupturable sheet material, and means to insure the easy rupture of said sheet material and to control the character and direction of the flow of the adhesive material from the casing so as not to flow outwardly beyond the edges of the overlapping covering sheet comprising at least one zone of weakness in said casing.

3. A device as defined in claim 2, in which said zone of weakness is located toward one margin of said casing, so as to control the flow of the adhesive material primarily in that direction upon rupture of the casing at said zone.

4. A device for securing an overlapping building surface covering sheet to an underlying building surface covering sheet comprising, a casing of a size and character to be placed between the building surface covering sheets, and a spreadable, flowable adhesive material within said casing, said casing comprising a rupturable sheet material, and means to insure the easy rupture of said sheet material and to control the character and direction of the flow of the adhesive material from the casing comprising at least one zone of weakness in said casing, and a pressure-sensitive adhesive carried by said casing on one surface thereof for contacting and adhering to one of the building surface covering sheets.

5. A device for securing an overlapping shingle to an underlying shingle comprising, a casing of a size and character to be placed between the shingles, and a spreadable, flowable, adhesive compound within said casing in predetermined, suitable amount for adhering said shingles securely together, said casing comprising frangible plastic film defining a pocket containing the adhesive compound, and means to insure the easy rupture of the film and to control the flow of the compound from the casing so as not to flow outwardly beyond the edges of the overlapping shingle consisting of lines of weakness in said film.

6. A device for securing an overlapping shingle to an underlying shingle comprising, a casing of a size and character to be placed between the shingles, and a spreadable, flowable adhesive compound within said casing, said casing comprising frangible sheet material, means to insure the easy rupture of the sheet material and to control the flow of compound from the casing consisting of lines of weakness in said sheet material, and a pressure-sensitive adhesive on a side of said casing whereby said casing may be adhered to one of said shingles by said pressure-sensitive adhesive.

References Cited in the file of this patent
UNITED STATES PATENTS

| | | |
|---|---|---|
| 1,661,564 | Ebbesen | Mar. 6, 1928 |
| 1,701,788 | Metters et al. | Feb. 12, 1929 |
| 2,323,342 | McManus et al. | July 6, 1943 |
| 2,666,354 | Dim et al. | Jan. 19, 1954 |